United States Patent Office 3,112,284
Patented Nov. 26, 1963

3,112,284
POLYEPOXIDE POLYESTERS OF TETRAHYDROPHTHALIC ACID AND GLYCOLS ESTERIFIED WITH LONG-CHAIN SATURATED ALIPHATIC ACIDS AND PREPARATION OF SAME
Sylvan Owen Greenlee, West Lafayette, Ind., and John W. Pearce, Racine, Wis., assignors to S. C. Johnson & Son, Inc., Racine, Wis.
No Drawing. Filed Dec. 22, 1958, Ser. No. 781,863
13 Claims. (Cl. 260—22)

This invention relates to new synthetic wax compositions and more particularly to new synthetic wax compositions prepared by esterifying polyepoxide polyesters of tetrahydrophthalic acid and glycols with long-chain saturated aliphatic acids.

The synthetic wax compositions of this invention may be advantageously used in the usual wax formulations which are provided for protecting and polishing surfaces and which, after they are applied, provide a coating which is moisture-resistant and which in most cases has a lustrous finish. The synthetic wax compositions are particularly valuable in the fortification of coating compositions such as varnishes and enamels, where a waxy constituent may be added to improve the gloss of the coating material, to increase its mar-resistance and dirt-resistance, and to lend to the coating material after hardening a wax-like "feel." More recently, fortified enamel compositions have found considerable utility in the food packaging industry where wax fortified enamels are used to aid in the release of certain solid foods such as meats from a can after the can has been opened.

While natural waxes including animal wax such as beeswax, vegetable waxes such as carnauba and ouricury, and mineral waxes, especially the paraffins, have been successfully employed as the waxy constituents in various compositions, these compositions have not been entirely satisfactory. For example, in the preparation of enamels or varnishes, even though drying agents are employed in unusually high concentrations, films prepared from these compositions having one of the above waxes as a component may require undue lengths of drying time, remaining sticky and tacky to the touch for periods often exceeding 72 hours. Other formulations have been found to lack the lasting adhesive qualities required of a varnish or enamel film. Furthermore, particularly in the case of varnish and enamel films, the wax component may be incompatible with the other materials used in the composition so that upon evaporation of the solvent used in the composition, a haze or cloud forms in the film.

It is, therefore, an object of this invention to provide new and improved synthetic wax compositions from polyepoxide polyesters of tetrahydrophthalic acid and glycols and long-chain saturated acids.

Another object of this invention is to provide new and improved synthetic wax compositions of the hereinbefore described character which may be readily incorporated with coating compositions to impart mar-resistance, and water and dirt resistance, and which are compatible with typical resinous materials used in the coating compositions.

These and other objects and advantages will become fully apparent from the following description, with particular reference to specific examples which are to be considered as illustrative only.

In general, the synthetic wax compositions of this invention may be prepared by esterifying the epoxide groups of a polyepoxide with long-chain saturated acids. The long-chain saturated acids are aliphatic monobasic acids containing about 16 or more carbon atoms and they are usually obtained as the saponification products of the reduced vegetable and animal fatty esters well known to the drying oil industry. These saturated aliphatic acids may be illustrated by such acids as stearic acid, behenic acid, palmitic acid, and cerotic acid.

The polyepoxide polyesters used in this invention may be conveniently prepared by epoxidizing the polyesters formed in the esterification of tetrahydrophthalic acid and glycols, the anhydride form of the acid usually being used. The polyesters may also be prepared by the reaction between glycols and simple esters of tetrahydrophthalic acid such as dimethyl or diethyl esters, so that the ethyl or methyl alcohol residue in the simple ester is displaced by the appropriate glycol.

Glycols which may be used in the preparation of the polyesters include such glycols as ethylene glycol, diethylene glycol, tetramethylene glycol, propylene glycol, neopentyl glycol and hexamethylene glycol, as well as the longer-chain glycols such as the 36-carbon glycol prepared by the sodium or catalytic reduction of the simple esters of dimerized 18-carbon soyabean oil acids. Since with tertiary glycols there is a tendency for dehydration to occur under the conditions necessary for esterification with the subsequent formation of a double bond, generally the primary and secondary glycols are the most satisfactory in the polyester formation.

Mixed polyesters may be employed in the invention. The term mixed polyesters is intended to embrace the reaction products of tetrahydrophthalic acid and a mixture of aliphatic glycols, a mixture of tetrahydrophthalic acid and another dibasic acid or acids with a single aliphatic glycol, or a mixture of tetrahydrophthalic acid and another dibasic acid or acids with a mixture of aliphatic glycols. Also embraced by the term are physical mixtures of these mixed reaction products and physical mixtures of the simple polyesters which comprise the reaction product of tetrahydrophthalic acid and a single aliphatic glycol.

Without intending to limit the invention in any way the following list of dicarboxylic acids which may be employed together with tetrahydrophthalic acid in the formation of the polyesters is given: oxalic, malonic, succinic, glutaric, adipic, pimelic, suberic, azelaic, sebacic, maleic, fumaric, malic, tartaric, diphenic, phthalic, isophthalic, terephthalic, 1,8-naphthalic, etc.

The polyesters may be further modified by the inclusion of small amounts of additional materials. For example, the solubility of the polyesters and resultant synthetic waxes can be increased by the addition of limited amounts of polyhydric alcohols and polybasic acids having more than two alcoholic hydroxyl groups and carboxyl groups respectively.

The degree of polymerization occurring during the polyester formation may be controlled by properly regulating the proportions of tetrahydrophthalic anhydride and glycols in the esterification reaction. Any excess acidity or hydroxyl content present in the polyester reaction mixture may be neutralized by reaction with a monofunctional alcohol or acid, respectively. By properly selecting the monofunctional reactant, slightly different properties may be given to the resulting polyester composition.

Polyepoxide polyesters may be prepared from these polyesters by epoxidizing the unsaturated portions of the tetrahydrophthalic acid residues in the polyester composition. These polyepoxide polyester compositions, as well as their preparation, are more fully described in a copending application having Serial No. 503,323, filed April 22, 1955, now abandoned.

The number of epoxide groups per molecule and the molecular weight of the polyepoxide polyester compositions may be controlled by adjusting the degree of polymerization which takes place, regulating the extent of the epoxidation of the polyester, and by proper selection of the glycols and dibasic acids used in the esterification reaction with tetrahydrophthalic acid. For instance, the epoxidized polymer formed by epoxidizing the polyester of a long-chain glycol and tetrahydrophthalic anhydride would have a lower degree of epoxidation per given weight than the epoxidized polymer formed by expoxidizing the polyester prepared with a shorter-chain glycol; and the molecular weight of each of these compositions may be controlled by adjusting the degree of polymerization in the polyester formation. Polyepoxide polyester compositions having up to 12 or more epoxide groups per molecule have been found to be useful in formulating the compositions herein described. The polyepoxide polyesters used herein may have varying structures so long as they do not contain functional groups which interfere with the desired reaction of the polyepoxide and the long-chain saturated acids.

The novel compositions of this invention are obtained by esterifying the epoxide groups of these polyepoxides, the initial reaction between an epoxide group and a carboxyl group of the saturated acids being illustrated by the following formula:

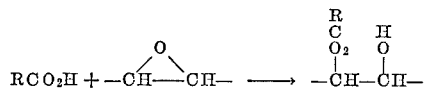

where R represents a saturated aliphatic residue of the formula $CH_3[CH_2]_{n-}$, $n$ having a value of at least about 14.

In the splitting of an epoxide group by a carboxyl group as indicated above, an hydroxyl group is formed which may be further esterified by carboxyl groups of the saturated acids. Compositions containing free epoxide groups, which are quite reactive, tend to be somewhat hydrophilic so that they will hydrolize in the presence of water. For this reason, compositions of this invention are prepared by reacting mixtures of saturated acids and polyepoxide polyesters in such proportions that the number of carboxyl groups in the mixture are substantially equivalent to, or greater than, the number of epoxide groups in the mixture. Since the epoxide groups are appreciably more reactive than the hydroxyl groups formed by the splitting of the epoxide groups, the products formed by reacting equivalent proportions of epoxide groups and carboxyl groups would be essentially esters of the polyepoxide and saturated acids having free hydroxyl groups approximately equal to the epoxide content of the original polyepoxide. When mixtures are reacted having an excess of carboxyl groups over epoxide groups, the hydroxyl groups formed by the splitting of the epoxide groups may be esterified, with the formation of water and a synthetic composition having up to two acid nucleii for each epoxide group present in the original polyepoxide used.

Elevated temperatures are usually required to carry out the reaction, and under conditions where water is formed from the esterification of the hydroxyl groups, it is frequently convenient to remove water from the reaction mixture as the reaction progresses. The water removal may be facilitated by bubbling inert gas through the reaction mixture or by removing the water by azeotropic distillation with a small amount of hydrocarbon solvent using a water trap connected to a condenser. When hydrocarbon solvents are used in the preparation of the subject compositions, after the reaction has been carried to completion, the compositions of this invention may be isolated from the solvent by vacuum distillation of the solvent from the reaction product. The solvent-free reaction products are resinous wax or glass-like compositons, most of which melt in the range of 30 to 60° C. No specific temperature can be given for esterification of the polyepoxide polyesters with the long chain acids, since, as is characteristic of many chemical reactions, the reactivity of the mixture depends on the physical and chemical characteristics of the reactants and additionally is a function of time, temperature, the degree of agitation, etc., employed. The sole criterion is that the mixture be brought to a temperature sufficient to esterify the epoxide groups of the polyester with the carboxyl groups of the long chain saturated aliphatic acids.

As stated earlier, the long chain saturated acids contemplated for use in the invention are aliphatic monobasic acids containing about 16 or more carbon atoms. The following saturated aliphatic acids are representative of this group of acids: stearic, behenic, palmitic, cerotic, margaric, nonadecylic, arachidic, lignoceric, montanic, and melissic. The longer chain saturated monocarboxylic aliphatic acids found as constituents of natural waxes such as sugarcane wax and carnauba are operable. The relatively shorter chain acids such as stearic, behenic, palmitic, and cerotic are preferred, however, because of their more ready availability.

Obviously, a single aliphatic monocarboxylic acid of the type specified may be reacted with the polyepoxide polyesters or mixtures of such acids may be employed.

Further modified products may be produced by simultaneously reacting a mixture of active hydrogen containing compounds and the long chain saturated aliphatic monocarboxylic acid with the polyepoxide polyesters. If a plurality of active hydrogens are available on each molecule of the hydrogen containing compound, the resultant composition will possess a cross-linked structure, the active hydrogens reacting with a number of the epoxide groups of the polyepoxide polyester. Among the active hydrogen containing compounds which may be used for this purpose are dicarboxylic acids such as those mentioned earlier for use with tetrahydrophthalic acid in the formation of mixed polyesters; polyamides such as those obtained by amidifying dibasic acids, such as the dimers of undecenoic acid, or the dimers of saturated animal and vegetable oil acids which include such acids as soyabean, linseed, or cottonseed oil acids, and animal fat or fish oil acids; aldehyde-amide condensates, such as the reaction product of aldehydes, particularly formaldehyde, with substituted or unsubstituted urea, thiourea and melamine; and phenol formaldehyde condensates, such as the reaction products of aldehydes with mononuclear phenols, polynuclear phenols, monohydric phenols or polyhydric phenols.

The following examples will further illustrate this invention, although it should be understood that the examples are for the purpose of illustration only and that it is not intended to limit this invention by reason of the examples given.

In these examples, the reaction between the polyepoxide polyesters and the monobasic saturated aliphatic acids was carried out at temperatures ranging from 190 to 275° C. The proportions expressed are parts by weight unless otherwise indicated.

The acid values as used herein represent the number of milligrams of KOH equivalent to the acidity present in a one gram sample.

Examples I to IX illustrate the preparation of several polyepoxide polyesters such as may be employed in this invention.

EXAMPLE I

A mixture of 1.1 mol tetrahydrophthalic anhydride and 0.2 mol n-butanol was placed in a 3-neck flask provided with a thermometer, a mechanical agitator, and reflux condenser attached through a water trap. After melting the tetrahydrophthalic anhydride in the presence of the butanol, 1 mol of 1,4-butanediol was added. The reaction mixture was gradually heated with agitation to 225° C. at which point a sufficient amount of xylene was added to give refluxing at esterification temperature. The reaction mixture was then heated with continuous agitation at 225–235° C. until the acid value decreased to 8.6, a period of about 24 hours. The polyester resin product was a highly viscous, tacky material having slight flow at room temperature, and an iodine value of 93.

A dehydrated acid form of a cation exchange resin (Dowex 50x–8, 50–100 mesh, Dow Chemical Company) was prepared by washing the resin several times with 4 to 6 normal hydrochloric acid, washing the neutralized resin with distilled water to remove excess acid and inorganic salt, and drying the product in a vacuum oven at a temperature of about 80° C. for a period of approximately 16 hours.

107 parts of the dehydrated acid form of cation exchange resin and 30 parts glacial acetic acid was placed in a 3-neck flask provided with a thermometer, a mechanical agitator, and a reflux condenser. The mixture of cation exchange resin and acetic acid was allowed to stand until the resin had completely taken up the acid. To this mixture was added 273 parts nonvolatile of the polyester resin dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. In some preparations involving other polyester resins, sufficient exothermic heat is produced during the addition of hydrogen peroxide so that no external heat is required, or even some external cooling may be required. The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 56.9. The percent nonvolatile of this solution, amounting to 559 parts, was 50.

A dehydrated basic form of a salt-splitting, amine type anion exchange resin (Dowex I, Dow Chemical Company) was prepared by washing the exchange resin several times with alkali, washing the neutralized resin with distilled water to remove excess alkali and inorganic salt, and drying the product in a vacuum oven at a temperature of about 80° C. for a period of approximately 16 hours.

The 559 parts of solution was thoroughly mixed with 175 parts of the dehydrated basic form of anion exchange resin. The resulting mixture was then filtered, followed by pressing as much of the solution as possible from the anion exchange resin cake. This product had an acid value of 10.1 on the nonvolatile resin content and an epoxide equivalent (equivalent weight to epoxide group) of 304 on the nonvolatile resin content.

The epoxy values as discussed herein were determined by refluxing for 30 minutes a 2-gram sample with 50 milliliters of pyridine hydrochloride in excess pyridine. The pyridine hydrochloride solution was prepared by adding 20 milliliters of concentrated HCl to a liter of pyridine. After cooling to room temperature, the sample is then back-titrated with standard alcoholic sodium hydroxide.

EXAMPLE II

Using the same procedure as in Example I, a polyester resin was prepared from 3 mols of tetrahydrophthalic anhydride, 2 mols of ethylene glycol, and 2 mols of n-butanol to give a product having an iodine value of 100 and an acid value of 4 based on the nonvolatile content.

252 parts nonvolatile of this polyester resin were epoxidized in accordance with the procedure given in Example I to give a product having an acid value of 6 on the nonvolatile content, and an epoxide equivalent on the nonvolatile content of 268.

EXAMPLE III

Using the same procedure as in Example I, a polyester resin was prepared from 1.1 mols of tetrahydrophthalic anhydride, 1 mol of diethylene glycol, and 0.2 mol of n-butanol to give a product having an acid value of 3.9 and an iodine value of 101 based on the nonvolatile content.

250 parts nonvolatile of this polyester resin were epoxidized in accordance with the procedure given in Example I to give a product having an acid value of 13.2 and an epoxide equivalent of 314, both values based on the nonvolatile content.

Example XVI describes a typical varnish formulation such as may be modified by wax constituents so as to have enhanced properties of mar resistance, water repellency, etc. While the compositions of this invention exhibit properties usually associated with wax materials, and may be employed in numerous ways, the utility of the composition is shown in connection with fortified varnish compositions where they have been found to be particularly valuable.

EXAMPLES IV–IX

Using the procedure of Example I, mixed polyepoxide polyesters were prepared using the reagents set forth in Examples IV to IX, Table 1, in the molar ratios indicated. Characterizing data with respect to both the polyepoxide polyesters and the intermediately formed polyesters is also presented in tabular form in Table 1.

*Table 1*

| Example | IV | V | VI | VII | VIII | IX |
|---|---|---|---|---|---|---|
| | Moles | Moles | Moles | Moles | Moles | Moles |
| Reagents Employed: | | | | | | |
| Tetrahydrophthalic Acid | 5 | 3 | 3 | 5 | 4 | 6 |
| Ethylene glycol | | | 2 | | 2 | 6 |
| Diethylene glycol | 5 | 2 | 2 | | 1 | 5 |
| 1,4-Butanediol | 4 | 6 | | 5 | | |
| Phthalic Anhydride | 5 | | | 1 | | |
| Succinic Anhydride | | 6 | | | | |
| Maleic Anhydride | | | 2 | | | |
| N-Butyl Alcohol | 2 | 2 | 2 | 2 | 2 | 2 |
| Dimer Acid [1] | | | | | | 6 |
| Polyester Data: | | | | | | |
| Percent Nonvolatile (N.V.) | 57.00 | 54.91 | 53.85 | 54.33 | 53.70 | 50.73 |
| Acid Value | 11.7 | 13.7 | 11.6 | 13.7 | 9.40 | |
| Iodine Value | 40.2 | 37.3 | 69.5 | 88.3 | 114.0 | 70.7 |
| Olefin Equivalent | 631 | 675 | 365 | 288 | 223 | 359 |
| Epoxidized Polyester Data: | | | | | | |
| Percent Nonvolatile (N.V.) | 57.10 | 53.25 | 51.10 | 52.52 | 53.76 | 33.35 |
| Acid Value (on N.V.) | 15.30 | 17.70 | 18.50 | 16.9 | 14.0 | 14.4 |
| Percent Oxiran Oxygen by Weight | 2.38 | 2.13 | 3.78 | 5.01 | 6.07 | 2.52 |
| Epoxy Equivalent | 672.2 | 751.9 | 423.8 | 319.3 | 263.7 | 635.5 |
| Percent Epoxidation Attained | 96.36 | 91.81 | 90.00 | 95.25 | 90.73 | 59.02 |

[1] A 36 carbon atom dicarboxylic acid obtained by heating the methyl esters of linoleic at high temperatures for 8–20 hours, commercially available from Emery Industries, Cincinnati, Ohio.

Examples X to XV, Table 2, disclose products of the invention prepared by reacting polyepoxide polyesters of Examples IV to IX with the long chain saturated aliphatic acids indicated. The quantities of polyesters and long chain acids utilized are stated in grams. The approximate reaction time and temperature of the reactions are given. Also given are the solubility of the synthetic resinous compositions in a number of well-known solvents, their acid values and melting points.

Table 2

EXAMPLES X–XV

[Key: S. soluble; V.S. very soluble; P.S. partially soluble; I.S. insoluble.]

| Example | X | XI | XII | XIII | XIV | XV |
|---|---|---|---|---|---|---|
| Polyester: | | | | | | |
| IV | | 67.2 g | | | | |
| V | | | | 75.2 g | | |
| VI | | | 42.4 g | 42.4 g | | |
| VII | | | 31.9 g | | | |
| VIII | | 26.4 g | 26.4 g | | | 84.7 g. |
| IX | 63.6 g | | | | 63.5 g | |
| Acid: | | | | | | |
| Lauric | 10.0 g | | | | | |
| Behenic | 16.2 g | | | | | 65.0 g. |
| Palmitic | | 64.1 g | | | | |
| Stearic | | | | 56.9 g | | |
| Phthalic | | | | .8 g | | |
| Azelaic | | | | | 1.0 g | 1.9 g. |
| Hydrofol AB [1] | | | 37.8 g | | 39.4 g | 31.5 g. |
| Hydrofol 410 [2] | | | | | 27.7 g | |
| Conditions: | | | | | | |
| Time | 5.0 hrs | 3.0 hrs | 7.0 hrs | 5.5 hrs | 5.5 hrs | 4.0 hrs. |
| Temperature | 235° C | 223° C | 226° C | 239° C | 220° C | 229° C. |
| Acid Value | 12.2 | 9.8 | 4.3 | 8.5 | 8.3 | 8.5. |
| M.P. (Durran's) | Glass | Glass | 42° C | 46° C | Glass | 52° C. |
| Solubility: | | | | | | |
| Heptane | S.; V.S. hot. | P.S. | V.S. | P.S. | V.S. | P.S.; V.S. hot. |
| Xylene | V.S. | V.S. | V.S. | V.S. | V.S. | V.S. |
| MEK (methyl ethyl ketone) | V.S. | V.S. | V.S. | V.S. | V.S. | V.S. |
| Bu. Alc | P.S.; V.S. hot. | V.S. | I.S.; S. hot. | P.S.; V.S. hot. | P.S.; S. hot. | I.S.; S. hot |
| CCl₄ | V.S. | V.S. | V.S. | V.S. | V.S. | V.S. |

[1] Defined in Example XVIII.
[2] A mixture of predominantly long chain saturated monocarboxylic acids in the following percentages: $C_{14}$, 0.4%; $C_{16}$, 29.2%; $C_{18}$, 70.4%; unsaturated, 0.9%.

Example XVI describes a typical varnish solution and Example XVII a typical wax fortified varnish solution which has enhanced mar resistance, water repellency, etc., prepared from the product of Example XVI.

EXAMPLE XVI

In a suitable jacketed vessel equipped with steam and coolant, mechanical agitator, thermometer, reflux condenser, and a bottom outlet were charged the following:

158 parts of BR9400 (a nonheat reactive, 100% phenolic, oil-soluble resin produced by Bakelite Corporation, New York, N.Y.).

The specifications for this resin are:

| | |
|---|---|
| Physical characteristics | Solid lump. |
| Softening point (ring and ball) | 141–155° C. |
| Specific gravity | 1.08. |
| Color | Amber. |

578 parts of Filtrez 625-N (a nonheat reactive, 100% phenolic, oil soluble resin produced by Filtered Resin Products Company, Boxley, Georgia).

The specifications for this resin are:

| | |
|---|---|
| Physical characteristics | Solid lump. |
| Softening point (ring and ball) | 147–155° C. |
| Specific gravity | 1.10–1.11. |
| Color | Amber. |
| Viscosity (50% in mineral spirits) | Z5–Z6 (Gardner-Holdt viscosity tube). |

508 parts of white refined linseed oil.

The temperature of the reaction mixture was raised quickly to 293° C. under conditions of agitation and held for 1 hour. At this point 1520 parts of tung oil were added to the reaction mixture and the temperature was held at 232° C. until a viscosity of A to A-3 was obtained (Gardner-Holdt viscosity tube). After suitable viscosity had been obtained, the reaction mixture was thinned with 252 parts of dipentene and 4070 parts of standard heavy naphtha. After the thinning step had been accomplished, 33 parts of 24% lead naphthenate, 12 parts of 6% cobalt naphthenate, 5 parts of 6% manganese naphthenate, and 20 parts of 5% calcium octoate were added to the varnish solution, these constitutents being dispersed in mineral spirits. The resultant hot solution was filtered to give 7150 parts of the standard varnish solution.

EXAMPLE XVII

Using the same procedure and constituents as in Example XVI, a varnish solution was prepared. However, prior to filtration, 13.8 parts of dipentaerythritol pentastearate were added to the mixture to obtain a wax fortified varnish product.

Using the varnish solution of Example XVI, a fortified varnish was prepared with various synthetic wax compositions of this invention. Examples XVIII, XIX, and XX illustrate the preparation of these compositions, using such proportions that the epoxide content was substantially equivalent to the carboxyl content in the reaction mixture, and their utility in fortifying varnish solutions.

EXAMPLE XVIII

Into a suitable round bottom, 3-neck flask, equipped with a mechanical stirrer, thermometer, reflux condenser and water trap were placed the following:

788 parts of hydrofol AB acid (produced by Archer-Daniels-Widland Company, Cleveland, Ohio). The specifications for this monobasic, saturated aliphatic acid are:

| | Percent |
|---|---|
| $C_{14}$ | 1.8 |
| $C_{16}$ | 13.5 |
| $C_{18}$ | 17.2 |
| $C_{20}$ | 38.3 |
| $C_{22}$ | 29.2 |
| Unsaturated content | 2.3 |

759 parts nonvolatile of Example I.

733 parts of xylene.

The acid value of this mixture was 91.4. The temperature of the mixture was raised slowly to 225° C. with the trapping of solvent. The reaction mixture was maintained at 225° C. for a period of about 2 hours, or until the acid value had reached 10.0. The solvent was then stripped from the reaction mixture usuing reduced pressures to yield a waxy solid having a melting point (Durrans' mercury melting point) of 44.3.

The varnish solution of Example XVI was fortified by mixing with the solution 1% (based on the nonvolatile content of Example XVI) of this waxy solid. Wet films of .002" thickness were prepared from this fortified varnish, and air-dryed for 24 hours. Similar films were prepared from the varnish solution of Example XVII. The latter fortified varnish is similar to those which may be currently procured commercially. After air drying for 24 hours both films exhibited the same resistance to water, as observed by the contact angle and dispersion of water droplets on the film. The dried films prepared using the new composition of this invention were completely devoid of cloudiness or haziness, indicating full compatibility of the synthetic wax and the resins used in the varnish solution.

EXAMPLE XIX

A synthetic wax composition was prepared as in Example XVIII using the following:

817 parts of Behenic acid
670 parts nonvolatile of Example II
740 parts of xylene The acid value of the initial reaction mixture was 99.9. The temperature of the mixture was raised slowly to 225° C. and maintained at 225° C. for a period of about 2 hours or until the acid value had reached 15.9. The solvent was then stripped as in Example XVII to yield a waxy solid having a melting point of 50.5.

The varnish solution of Example XVI was fortified with 1% (based on the nonvolatile content of Example XVI) of this waxy solid. Wet films of .002" thickness were prepared from this wax fortified varnish, and air dryed for 24 hours. The water resistance of these films was equal to or better than the water resistance displayed by varnish films prepared in an identical manner from the product of Example XVII. No cloudiness or haziness was observed in the dried films.

EXAMPLE XX

A synthetic wax composition was prepared as in Example XVIII using the following:

710 parts stearic acid
800 parts nonvolatile of Example III
750 parts of xylene

The acid value of the initial reaction mixture was 94.0. The temperature of the mixture was raised slowly to 225° C. and maintained at this temperature for a period of about 2 hours or until the acid value had reached 8.3. The solvent was then stripped as in Example XVII to yield a waxy solid having a melting point of 35.0° C.

The varnish solution of Example XVI was fortified with 1% (based on the nonvolatile content of Example XVI) of this waxy solid. Wet films of .002" thickness prepared from this wax fortified varnish and air dried for 24 hours exhibited a water resistance equal to or greater than the resistance shown by the films prepared in an identical manner from the product of Example XVII. No cloudiness or haziness was observed in the dried films.

The remaining examples illustrate the preparation of synthetic compositions of this invention using reaction mixtures wherein the carboxylic acid content of the mixtures was substantially greater than the epoxide content.

EXAMPLE XXI

In a 3-neck reaction vessel equipped with mechanical stirrer, thermometer, reflux condenser and water trap was placed 64 parts nonvolatile of the product of Example II, 89 parts of stearic acid, and 64 parts of xylene. The acid value of the unreacted reaction mixture, based on nonvolatile content, was 118.4. The reaction was heated slowly to 100° C. at which point reflux began. Water and solvent were slowly trapped off from the reaction mixture while the temperature was raised to 190° C. in the course of 4 hours.

At this point the solvent was stripped from the reaction using reduced pressures and a waxy solid isolated in the amount of 148 parts. The acid value of the waxy solid was 12.9 and the Durrans' mercury melting point was 41.5° C.

The varnish solution of Example XVI was fortified with 1% (based on the nonvolatile content of Example XVI) of this waxy product. Wet films of .002" thickness prepared from this wax fortified varnish and air dried for 24 hours demonstrated a resistance to water equal to or greater than the water resistance exhibited by the films prepared in an identical manner from the product of Example XVII.

These same film properties were shown when the films were examined after 72 hours. The films prepared from the composition of this invention were entirely free of haziness or cloudiness.

EXAMPLE XXII

Using the procedure of Example XXI, 86.6 parts nonvolatile of the product of Example III and 138 parts of Hydrofol AB acids were reacted to yield a waxy composition. The initial acid value of the unreacted reaction mixture was 111.4 and the acid value of the isolated reaction product was 23.3. The Durrans' mercury melting point of the product was 48.0° C. The varnish solution of Example XVI was fortified with 1% (based on the nonvolatile content of Example XVI) of this waxy product. Films of .002" thickness prepared from this wax fortified varnish and air dried for 24 hours showed resistance equal to or greater than the water resistance of the films prepared in an identical manner from the product of Example XVII. The same film properties were exhibited when the films were re-examined after 72 hours, and no haziness or cloudiness was observed in any of the films using the composition of this invention.

EXAMPLES XXIII–XXVIII

Varnish solutions of Example XVI were fortified with 1% (based on the nonvolatile content of Example XVI) of each of the resinous products of Examples X to XV. Wet films of .002" thickness were prepared from these fortified varnish solutions and air dried for 24 hours. The water resistance of all these films compared favorably with the water resistance of varnish films prepared in an identical manner from the product of Example XVII. The dried films were haze and cloud free.

While various embodiments of this invention have been described, it should be understood that it is not intended to restrict the invention thereto, and that it is desired to cover all modifications of the invention which would be apparent to one skilled in the art and that come within the scope of the appended claims.

This application is a continuation-in-part of S.N. 522,168, filed July 14, 1955, now abandoned.

We claim:

1. A new resinous synthetic wax composition comprising the polyester of:
   (A) an epoxidized polyester of tetrahydrophthalic acid and a glycol, said polyester having an average of more than one epoxy group wherein the epoxy oxygen atom is linked to adjacent carbon atoms in the nucleus of said acid, and
   (B) a long chain aliphatic saturated monocarboxylic acid having at least about 16 carbon atoms.

2. The composition of claim 1, wherein the long chain saturated monocarboxylic acid is stearic acid.

3. The composition of claim 1, wherein said glycol is a 1,4 butanediol.

4. The composition of claim 1, wherein said glycol is ethyleneglycol.

5. The composition of claim 1, wherein said glycol is diethylene glycol.

6. The composition of claim 1, wherein said glycol is a mixture of aliphatic glycols.

7. The composition of claim 1, wherein said long chain aliphatic saturated monocarboxylic acid is a mixture of aliphatic saturated monocarboxylic acids having at least about 16 carbon atoms.

8. The composition of claim 1, wherein said epoxidized polyester of (A) is comprised of at least one organic dicarboxylic acid in addition to tetrahydrophthalic acid.

9. A method of preparing new resinous synthetic wax which comprises heating to their esterification temperature a mixture of:
(A) an epoxidized polyester of tetrahydrophthalic acid and a glycol, said polyester having an average of more than one epoxy group wherein the epoxy oxygen atom is linked to a adjacent carbon atoms in the nucleus of said acid, and
(B) a long chain aliphatic saturated monocarboxylic acid having at least about 16 carbon atoms.

10. A method of preparing a new resinous synthetic wax in accordance with claim 9, wherein said glycol is a mixture of aliphatic glycols.

11. A method of preparing a new resinous synthetic wax in accordance with claim 9, wherein said long chain aliphatic saturated monocarboxylic acid is a mixture of aliphatic saturated monocarboxylic acids having at least about 16 carbon atoms.

12. The method of preparing a new resinous synthetic wax in accordance with claim 9, wherein said epoxidized polyester of (A) is comprised of at least one organic dicarboxylic acid in addition to tetrahydrophthalic acid.

13. A method of preparing a new resinous synthetic wax in accordance with claim 9, wherein said mixture of (A) and (B) contain from about 1 to about 2 carboxyl groups of (B) for each epoxide group of (A).

References Cited in the file of this patent

UNITED STATES PATENTS

| | | |
|---|---|---|
| 2,691,004 | Doyle | Oct. 5, 1954 |
| 2,806,057 | Finch et al. | Sept. 10, 1957 |
| 2,907,735 | Greenlee | Oct. 6, 1959 |
| 2,909,495 | Rosenberg | Oct. 20, 1959 |
| 2,960,485 | Molton et al. | Nov. 15, 1960 |